Jan. 8, 1952     R. A. HARTMAN ET AL     2,581,481
FASTENING DEVICE
Filed Jan. 28, 1948     2 SHEETS—SHEET 1
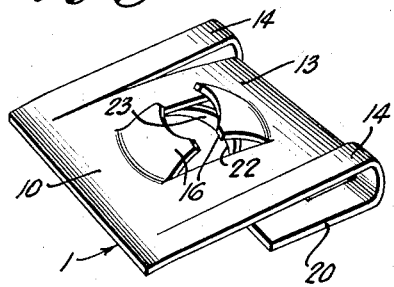
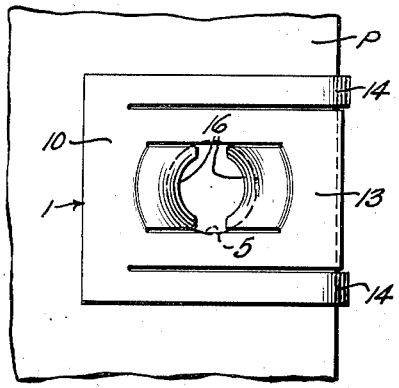
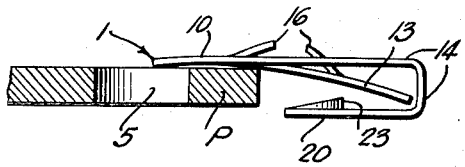
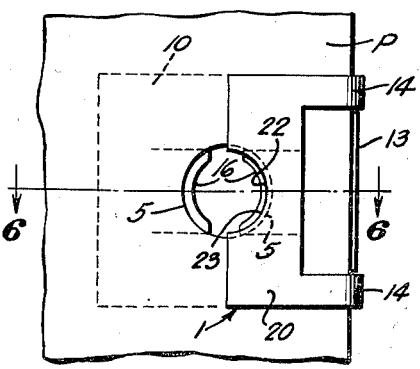
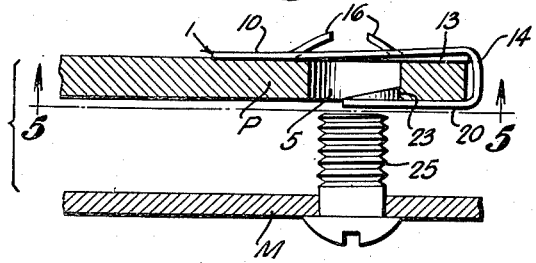
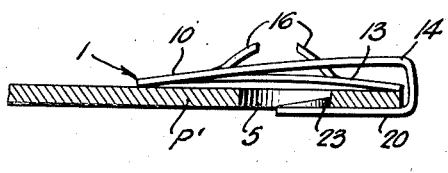
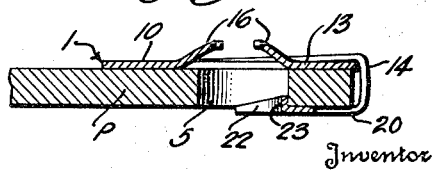
Inventor
RICHARD A. HARTMAN
LAURENCE H. FLORA
By H. G. Lombard
ATTORNEY

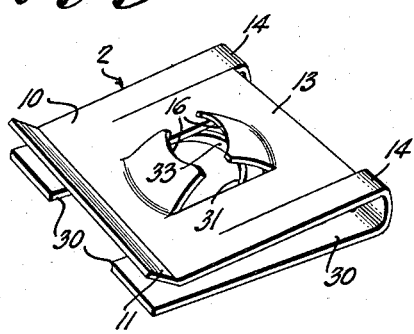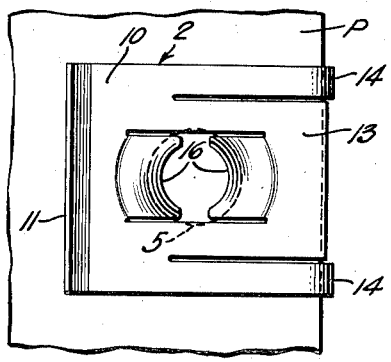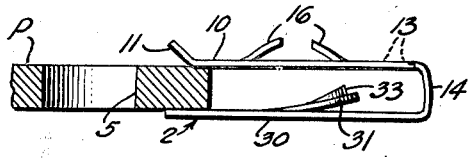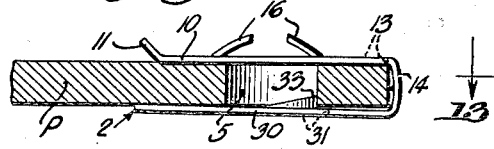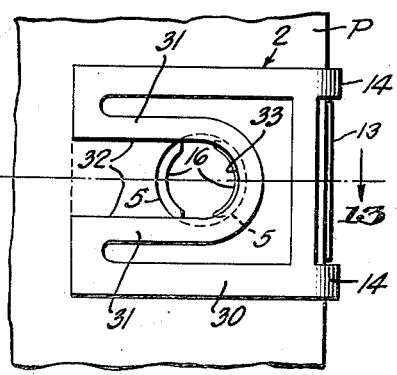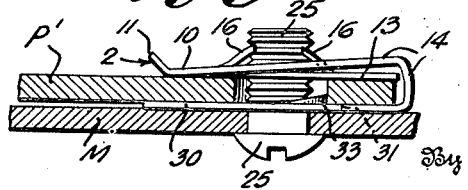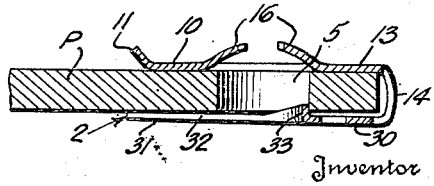

Patented Jan. 8, 1952

2,581,481

UNITED STATES PATENT OFFICE 2,581,481

FASTENING DEVICE

Richard A. Hartman and Laurence H. Flora, Cleveland, Ohio, assignors to Tinnerman Products, Inc., Cleveland, Ohio, a corporation of Ohio Application January 28, 1948, Serial No. 4,914

1 Claim. (Cl. 151—41.75)

This invention relates in general to fastening installations and deals, more particularly, with improvements in fasteners having attaching mean for holding the fasteners in an assembly prior to the application of a cooperating part thereto for completing the installation.

In the general construction of clasp type fasteners, such as attachable nut devices and the like, the fasteners are provided in various designs to comprise a pair of arms adapted to clasp a part adjacent a stud passage therein to hold the fastener in position for receiving a bolt or screw to secure such part in an installation. Heretofore, any such fastener designed to clasp a part of a certain thickness in the use thereof has been more or less limited to use on parts of such specific thickness due to the fact the fastener would not seat properly on parts of other thicknesses nor clasp the same with the necessary degree of clamping pressure required for proper function of the fastener. For example, in securing a plate or panel, it has been the general practice to space the arms of the fastener with the precise spacing required to provide a snug fit between the arms and the opposite sides of the plate or panel. Consequently, a fastener so designed for clasping a part of specific thickness is not adapted to operate satisfactorily on parts of other thicknesses.

A primary object of the invention, therefore, is to provide an attachable fastener of the kind described which is adapted to be used satisfactorily with parts of different thicknesses and which is otherwise designed to seat properly on any such part in the most effective manner for its intended fastening purpose.

A further object of the invention is to provide an attachable nut, or like fastener, adapted to be attached to parts of considerably different thicknesses, comprising a simplified sheet metal device defining a pair of spaced body portions for embracing an apertured part together with a resilient spring arm provided on one of said body portions and cooperating with the other body portion in a manner to adapt the fastener to the thickness of such part in order to seat the fastener in its most effective and proper fastening position thereon.

Another object of the invention is to provide a fastener of this character which includes a locking detent serving as an indexing or positioning means that is easily and quickly applied to the aperture in said part through the medium of a sight opening adjacent said detent for guiding the fastener to attached position.

A further object is to provide a fastener of this kind having such indexing means which is designed to center the fastener in attached position over a stud opening in a part and otherwise lock the fastener automatically in such attached fastening position.

A more specific object is to provide such a fastener in which the indexing and locking means is provided on the spring arm of the fastener that adapts the fastener to the thickness of the part to which the fastener is attached.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a perspective view of one form of the improved fastener designed for attachment to parts of different thicknesses in accordance with the invention;

Fig. 2 shows the fastener of Fig. 1 in side or edge elevation as applied to an apertured part of relatively thick dimension, represented in section;

Fig. 3 is a similar view showing the fastener in fully attached fastening position to such a part, and with a cooperating bolt or screw about to be applied thereto to complete an installation;

Fig. 4 is a top plan view of Fig. 3 showing the thread engaging means of the fastener;

Fig. 5 is a sectional view of Fig. 3, as along line 5—5, looking in the direction of the arrows, showing in bottom plan the attaching portion of the fastener;

Fig. 6 is a sectional view along line 6—6 of Fig. 5, looking in the direction of the arrows; and, Fig. 7 shows the same fastener of Figs. 1 to 6 inclusive as applied to fastening position on a part of relatively thin dimension to seat thereon with equal effectiveness;

Fig. 8 is a perspective view of another form of the fastener adapted for attachment to parts of different thicknesses in accordance with the invention;

Fig. 9 discloses the fastener of Fig. 8 in side or edge elevation as initially applied to a part of relatively thick dimension, represented in section;

Fig. 10 is a similar view showing the fastener of Fig. 9 in fully attached position;

Fig. 11 is a top plan view of Fig. 10 showing the bolt or screw engaging means of the fastener;

Fig. 12 is a bottom plan view of Fig. 10 showing the design of the locating and locking means for retaining the fastener of Figs. 8 to 11 inclusive in applied fastening position;

Fig. 13 is a sectional view of Fig. 12, as along line 13—13, looking in the direction of the arrows;

Fig. 14 shows the same fastener of Figs. 8 to 13 inclusive as applied to fastening position on a part of relatively thin dimension together with a cooperating bolt or screw about to be applied thereto to complete the installation; and, Fig. 15 is a similar view showing the installation of Fig. 14 as completed and illustrating the disposition of the fastener in such a completed installation.

In general, a fastening device in accordance with the present invention is best provided from any suitable sheet metal material, preferably tempered spring metal or cold rolled metal having spring-like characteristics. The fasteners are most economically provided by generally rectangular blanks obtained from standard sheet metal strip stock with little loss or waste of material. The fastener is shown in several forms with a floating, resilient spring arm, serving as a yieldable take-up means which adapts the fastener for attachment to apertured plates, panels, or other articles of different thicknesses, together with attaching means including a locking detent serving as an indexing or positioning means and an adjacent sight opening which facilitates application of the fastening device to attached fastening position on an apertured part. While the invention is disclosed in connection with attachable nut devices, it will be appreciated that as respects the clasp type of attaching means for attaching the fastener to parts of different thicknesses, the invention is not limited to such use, but rather, is equally adapted to various other applications and uses for attaching a fastener designed to support a cable, molding or other object in an installation.

Referring now, more particularly, to the drawing, Fig. 1 shows one form of the improved fastening device of the invention, designated generally 1, which is constructed of a section of sheet metal strip material having a U-shaped bend defining a body portion 10 and a shorter, return bent body portion 20. These body portions 10, 20, are spaced apart a distance corresponding to the range of thickness of parts with which the fastener is intended for use. The body portion 10 is provided with a pair of longitudinal slits providing a spring arm 13 between side portions 14 which define the generally U-shaped formation of the fastener and connect the body portions 10, 20, in predetermined spaced relation, as aforesaid. The spring arm 13 is free at one end and is bent in generally bowed or arcuate form to extend, in its normal untensioned relation, into the space between said spaced body portions 10, 20, as best seen in Fig. 2.

The resilient spring arm 13 is provided with a thread opening defining means for threadedly engaging a bolt or screw. Preferably such a thread opening is defined by a pair of cooperating tongues 16, or the like, provided by a pair of spaced parallel slits on opposite sides of an aperture forming a passage for the bolt or screw. The thread engaging tongues 16 illustrate only one form of such thread engaging means which may be employed, and it is to be understood that the present invention is not limited in any manner or form to the specific construction of such thread engaging means 16, but rather, contemplates also, any other related form of thread engaging tongues or equivalent thread engaging means.

The body portion 20 of the fastening device is carried by the generally U-shaped side portions 14 and terminates substantially below and in line with the thread opening between the tongues 16 in the opposing body portion 10. As best seen in Figs. 1, 5, and 6, the extremity of the body portion 20 is recessed in a manner to provide a generally arcuate sight opening 22 and an adjacent upstanding locking projection or detent 23 formed by a bent marginal portion of said sight opening. Preferably, said detent 23 is thus formed from a marginal edge portions of the sight opening 22 to define a generally semicircular indexing or positioning element which snugly engages the wall of a bolt opening in a part to retain the fastening device in attached position thereon. The locking detent 23 preferably has its upper edge surface tapered generally downwardly and outwardly toward the free end of the body portion 20 to define an inclined cam surface.

The inclined cam surface of the locking detent 23 provides a flared entrance to the space between the body portions 10, 20, which facilitates the initial application thereof to a part P by causing a gradual outward camming of said detent as necessary to clear the edge of said part easily and quickly. In the initially applied position of the fastener, the sight opening 22, Fig. 5, at the free end of body portion 20 leaves the bolt passage 5 in the part P uncovered and fully visible such that the fastening device may be guided readily, in the least amount of time and effort, to its proper attached position in which the locking detent 23 snaps into said bolt opening 5 in the final applied fastening position of the fastening device on said part P, as shown in Figs. 5 and 6. The locking detent 23 is preferably semicircular and thereby snugly engages a material edge portion of the circular bolt opening 5 to lock the fastening device in attached position while otherwise leaving a sufficiently large passage for receiving any suitable bolt or screw fastener 25, Fig. 3, to be applied to the thread engaging tongues 16 to secure a member M to said part P in a completed fastening installation.

Referring to Figs. 2, 3, and 7, it will be understood that the fastening device thus provided with the yieldable or floating spring arm 13 extending free between the spaced body portions 10, 20, is adapted for ready attachment to the relatively thick part P, Figs. 2 and 3, or the relatively thin part P', Fig. 7, or any other part having a thickness within the range of use of the fastener. In the application of the fastener as shown in Fig. 2, the inclined surface of detent 23 cams outwardly against an edge of said part P while the spring arm 13 cams against the opposing edge of the part and gradually yields as necessary in accordance with the thickness of the part to permit said part to be fully received between the spaced body portions 10, 20, of the fastener. In any case, the resilient spring arm 13 and the opposing body portion 20 engage opposite faces of the part to retain the fastener in the attached fastening position, as shown in Figs. 3 and 7. The spring arm 13, regardless of the thickness of said part, automatically seats evenly and uniformly on the part in a manner whereby the thread engaging tongues 16 are positioned for application of the bolt or screw 25 thereto, Fig. 3, in a direction generally normal to the base of said spring arm 13 and at right angles to the part secured in the most effective and proper manner.

It will be appreciated that the improved fastener of the invention has a wide range of application to parts of different thicknesses by virtue of the design of the spring arm 13 to extend free between the spaced body portions 10, 20, to serve as a yieldable take-up means which accommodates the fastener for attachment to a part of any particular thickness. In any case, the body portion 20 is firmly and rigidly seated against one side of the engaged part while the spring arm 13 pivots relative to the side portions 14 of the other body portion 10 as necessary to seat on the opposite side of said part in the most effective manner in applied fastening position, as aforesaid. At the same time, the locking detent 23 on the body portion 20 snaps into and engages the adjacent wall of the bolt opening 5 in the part P or P' to lock the fastener in such applied fastening position.

The thread engaging elements 16 are best provided from the sheet metal material of the spring arm 13 by an aperture intermediate spaced parallel slits which form cooperating tongues, or the like, having spaced extremities lying on a helix and defining the desired thread or thread opening corresponding substantially to the root of the bolt or screw for threadedly engaging the thread thereof. Said tongues 16 otherwise are preferably formed to project out of the plane of the spring arm 13 and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the fastener in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, such thread engaging means prepared in the form of cooperating, yieldable tongues as shown, are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions of the bolt or screw, wherefore the extremities of said tongues tend, more effectively, to move toward each other and dig into the grooves intermediate adjacent thread convolutions of the bolt when tightened and otherwise become embedded in the root of the bolt in locked, frictional fastening engagement therewith. Thus, in the present example, the tongues are shown as extending out of the plane of the arm 13 in substantial ogee formation and provided preferably with arcuately notched extremities, forming substantial biting jaws designed to cut into the root of the bolt and the adjacent thread surfaces thereon in positive locking relation therewith in the most effective manner. It is to be understood, however, that the present invention is not limited in any manner or form to the illustrated construction of the thread engaging means but rather, fully contemplates, any similar or related form of such tongues or equivalent thread engaging elements.

Figs. 8–15 inclusive disclose another form of fastening device of the invention, designated generally 2, which is similar in purpose, function and use to that described with reference to Figs. 1–7 inclusive. The fastener comprises a similar body portion 10 provided with a spring arm 13 extending free between the side portions 14 and provided with thread engaging means such as tongues 16, or the like. Preferably an outwardly flared lip 11 is formed on the free end of said body portion 10 to facilitate the initial application of the clip over the edge part P as shown in Fig. 9.

The other body portion 30 is defined by a return bent end of the blank in a generally U-shaped form to approximate the length of the body portion 10. As best seen in Fig. 12, the body portion 30 is provided with a cut-out area defining a spring arm 31 having a slot 32 serving as a sight opening and a detent 33 at the inner end of said slot formed by an upwardly bent portion of the adjacent marginal edge of said slot. Preferably said detent 33 has an inclined cam surface on its upper edge and is otherwise formed in a generally semicircular design in a manner similar to the detent 23 in the fastener of Figs. 1–7 inclusive, for snugly engaging in the bolt opening 5 in a part to which the fastener is attached. The spring arm 31 otherwise is bent to extend inwardly between the spaced body portions 10, 30 in normal untensioned relation, as illustrated in Fig. 9.

Accordingly, referring to Figs. 9, 10, and Figs. 14, 15, it will be understood that the fastener thus provided is readily adapted to be attached to the relatively thick part P, Figs. 9 and 10, or the relatively thin part P', Figs. 14, 15, or any part having a thickness in the range of use of the fastener. In the initial application of the fastener, Fig. 9, the outwardly flared lip 11 on the body portion 10 facilitates the introduction of the part P between the spaced body portions 10, 30 while the slot 32, Fig. 12, is used as a sight opening to guide the detent 33 toward the bolt opening 5. As the fastener is pushed to home position shown in Figs. 10 and 12, the spring arm 31 cams the edge of said part and gradually yields as necessary to accommodate the thickness thereof and permit said part to be fully received between the spaced body portions 10, 30 of the fastener. In any case, as shown in Figs. 10 and 14, said resilient spring arm 31 and the opposing body portion 10 engage opposite sides of the part to retain the fastener in attached fastening position. It will be appreciated, therefore, that this form of the improved fastener also has a wide range of application to parts of different thicknesses by virtue of the design of the spring arm 31 to extend free between the spaced body portions 10, 30, to serve as a yieldable take-up means which adapts the fastener for attachment to a part of any particular thickness, and with the locking detent 33 on said spring arm engaging the adjacent wall of the bolt opening 5 in any such part P or P' to lock the fastener in applied fastening position.

In instances where the thickness of the part P approximates the spacing between the body portions 10, 30, as shown in Figs. 10 and 13, the spring arm 13 in the outer body portion 10 automatically seats in substantially flush engagement with said part and with the thread engaging means 16 properly positioned for most effective application of the bolt or screw 25 thereto in a direction generally normal to said part P.

However, when the fastener is applied to a relatively thin part P', as shown in Fig. 14, the side portions 14 of the fastener project beyond the inner surface of the part P' with the spring arm 13 carrying the thread engaging means 16 extending free between said side portions 14. Accordingly, when the member M to be secured is brought flush against the part P', as shown in Fig. 15, the spring arm 31 moves into the plane of body portion 30 while the other spring arm 13 is adapted to pivot relatively to said side portions 14 to bear evenly against part P' so that the thread engaging elements 16 thereon are suitably disposed for threadedly engaging the bolt or screw 25 in the most effective and proper manner in which said screw is applied generally normal to the base of said spring arm 13. Thus, when the bolt or screw 25 is applied as shown in Fig. 15, the spring arm 13 pivots inwardly into the space between the spaced body portions 10, 30, to bear evenly on the part P' as the side portions 14 are moved outwardly from the position of Fig. 14 to the position of Fig. 15 in which the member M is drawn up flush against said part P' and secured firmly and rigidly in the completed installation. A divisional application Serial Number 200,230 filed December 11, 1950, is directed to the forms of the invention shown in Figs. 8–15, inclusive.

The fastening device in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means.

While the invention has been described in detail with specific examples, such examples are intended as illustrations only, inasmuch as it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claim rather than by the foregoing description, with all changes falling within the scope, meaning and range of equivalency of the claim intended to be embraced therein.

What is claimed is:

A fastener comprising a piece of sheet metal having a return bend defining a pair of spaced, slightly converging body portions extending in the same general direction and adapted to receive therebetween in attached relation any of several apertured parts of different thicknesses between the limits of a thin part of considerably less thickness than the spacing of said body portions to a thick part having a thickness slightly less than the spacing of said body portions, one of said body portions being provided with a spring arm stamped therefrom having a free end extending toward said return bend of the fastener, said spring arm having an opening substantially centrally thereof and provided with thread engaging means on the periphery of said opening for threadedly engaging a bolt or screw, said spring arm being bent bodily inwardly toward the other body portion such that said free end thereof is spaced from said other body portion a distance less than the thickness of any part with which the fastener is intended to be used, said inwardly bent spring arm being adapted to yield in accordance with the thickness of the part to which the fastener is applied to cooperate with said other body portion of the fastener in engaging opposite sides of said part in the attached position of the fastener thereon, said spring arm in such attached position of the fastener being adapted to lie substantially parallel to the part to which the fastener is applied with said other body portion in surface engagement with said part regardless of the thickness of said part and with said thread engaging means on said spring arm in position for even and uniform threaded engagement with a bolt or screw to be applied to said thread engaging means with the axis of said bolt or screw in normal relation to said part, said other body portion having an opening concentric with said thread engaging means and of such size as to permit free passage of said bolt or screw, and an inwardly projecting detent adjacent said latter opening, said detent having a surface sloping downwardly toward the free end of said other body portion for facilitating application of the fastener to said part, and said detent being receivable in the aperture in said part to retain the fastener in said attached position on said part.

RICHARD A. HARTMAN.
LAURENCE H. FLORA.

REFERENCES CITED

The following references are of record in the file of this patent:

UNITED STATES PATENTS

| Number | Name | Date |
| --- | --- | --- |
| 357,351 | Welliver | Feb. 8, 1887 |
| 2,230,355 | Kost | Feb. 4, 1941 |
| 2,233,230 | Tinnerman | Feb. 25, 1941 |
| 2,255,469 | Kost | Sept. 9, 1941 |
| 2,358,890 | Tinnerman | Sept. 26, 1944 |
| 2,390,750 | Tinnerman | Dec. 11, 1945 |